May 5, 1925.                                                          1,536,958
E. WUNDERLICH
COTTON DRIER
Filed July 22, 1924                    3 Sheets-Sheet 1

Emil Wunderlich
INVENTOR
BY Victor J. Evans
ATTORNEY

May 5, 1925. 1,536,958
E. WUNDERLICH
COTTON DRIER
Filed July 22, 1924 3 Sheets-Sheet 2
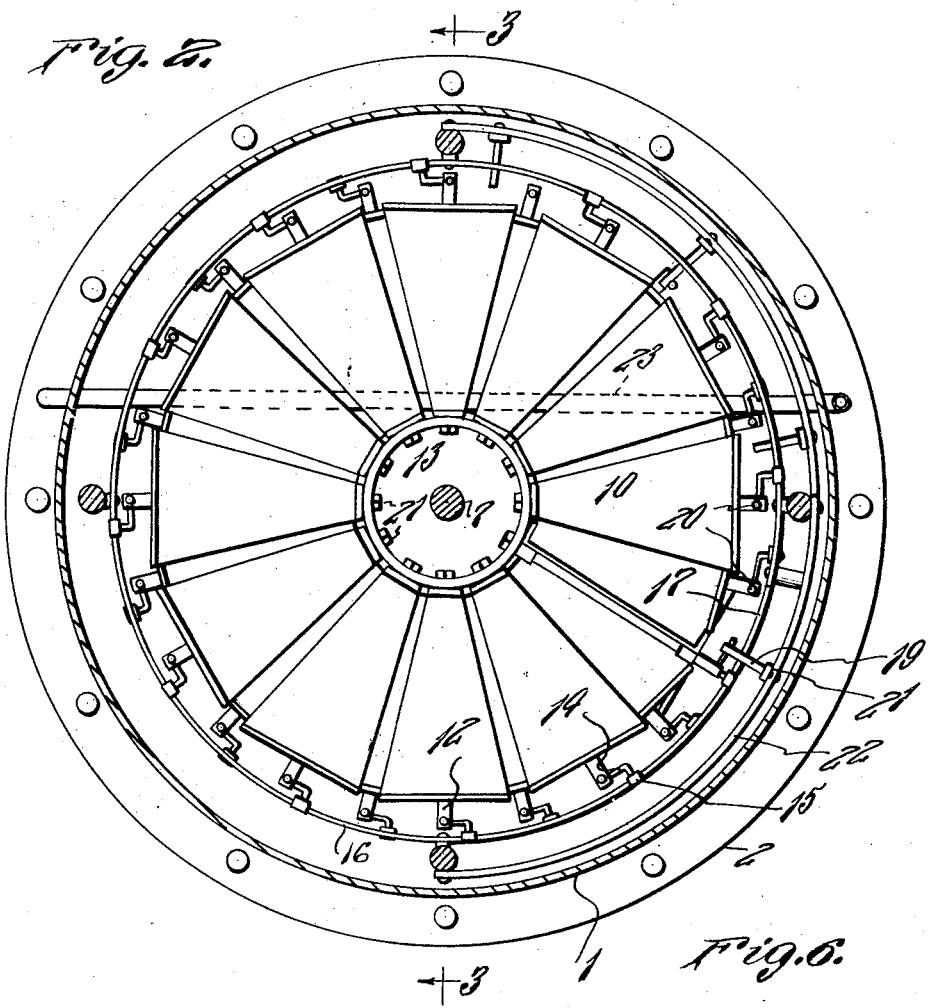
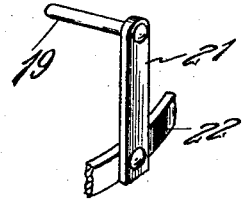
Emil Wunderlich INVENTOR
BY Victor J. Evans ATTORNEY

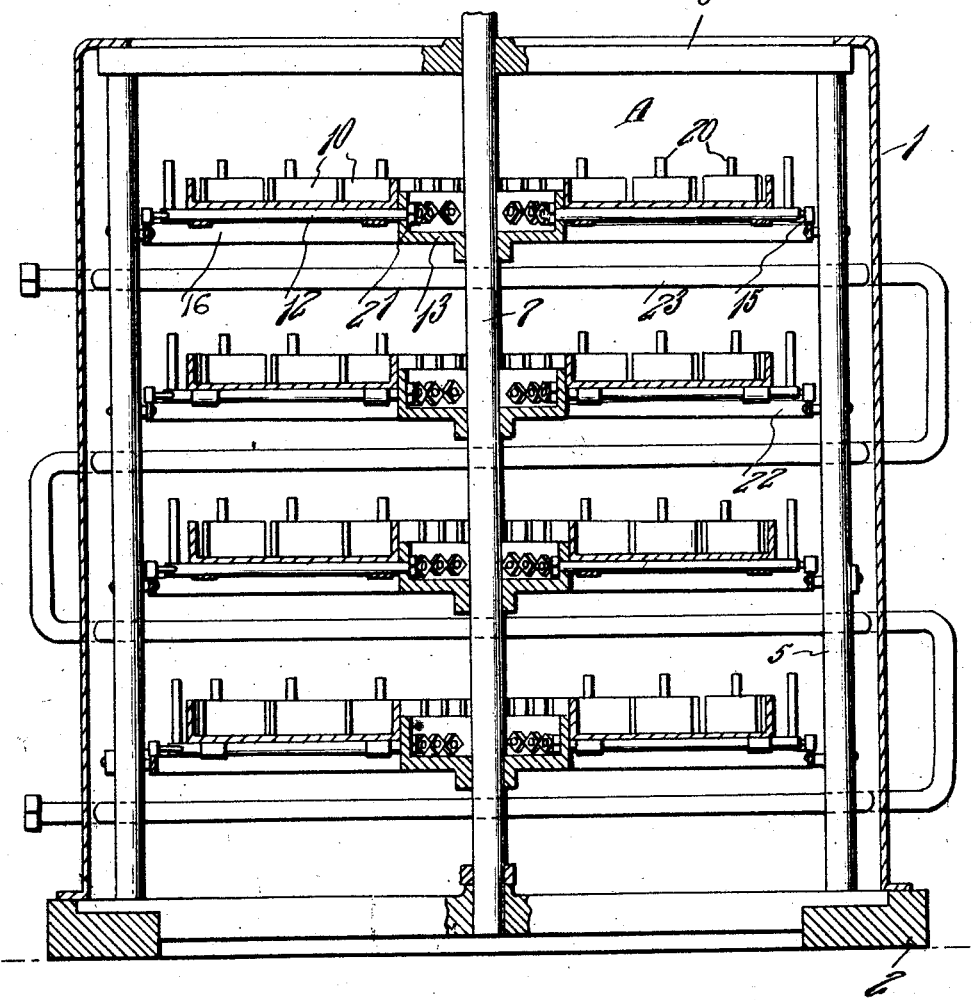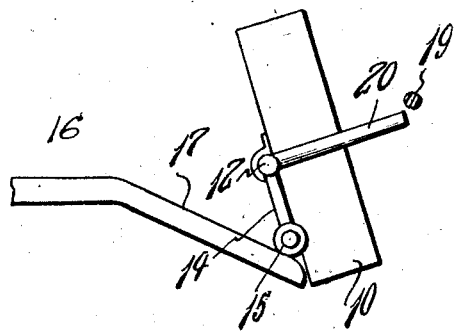

Patented May 5, 1925.

1,536,958

UNITED STATES PATENT OFFICE.

EMIL WUNDERLICH, OF YORKTOWN, TEXAS.

COTTON DRIER.

Application filed July 22, 1924. Serial No. 727,570.

*To all whom it may concern:*

Be it known that I, EMIL WUNDERLICH, a citizen of the United States, residing at Yorktown, in the county of Dewitt and State of Texas, have invented new and useful Improvements in Cotton Driers, of which the following is a specification.

This invention relates to a drying apparatus for drying cotton or other material and for sterilizing seed and the like, the general object of the invention being to provide a plurality of trays arranged in a drying casing, one above the other, with means for rotating the trays and for causing the material to drop from one trap upon another after the tray has made a revolution so that the material will be subjected to the heat within the casing for a long time while it is passing through the device.

Another object of the invention is to make each tray in sections with means for dumping a section after it has made a complete revolution.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a section on line 2—2 of Figure 1.

Figure 3 is a section on line 3—3 of Figure 2.

Figure 4 is a perspective view of one of the tray sections.

Figure 5 is a detail view showing a section in dumping position.

Figure 6 is a view of the stationary part for upsetting or dumping a tray.

Figure 1:
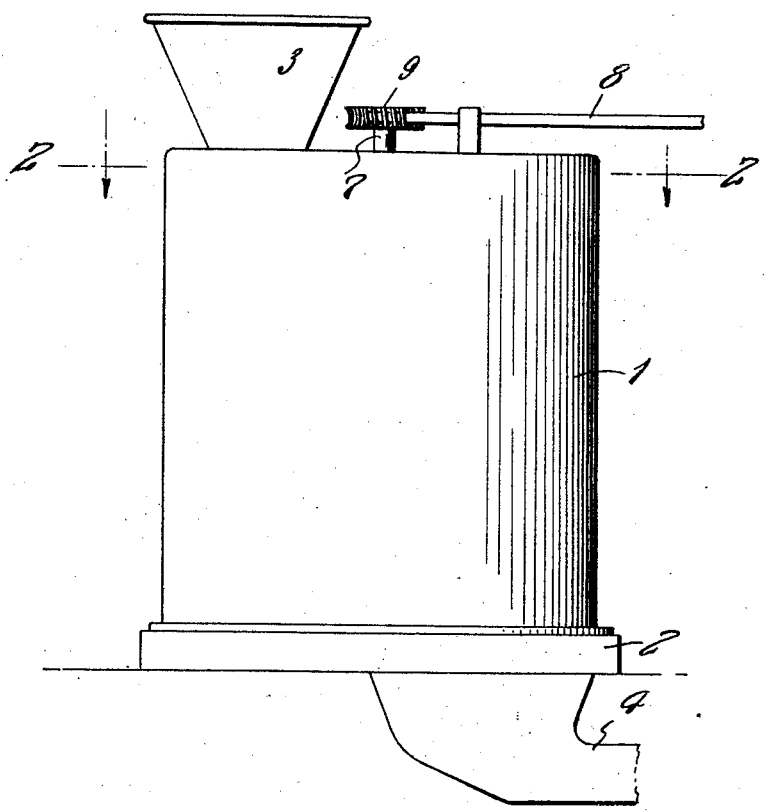
Figure 1 is a side view of the device.
Figure 7:
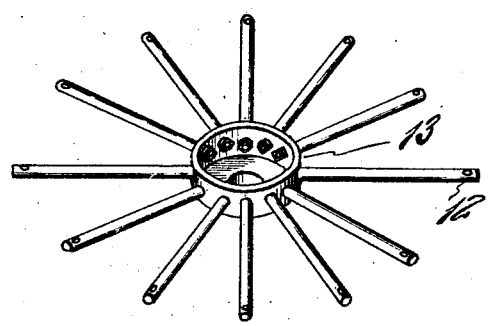
Figure 7 is a view of one of the hub and spoke arrangements of a tray.

In these views, 1 indicates a casing which is supported on a base 2 and has a hopper 3 at its top by which material can be fed into the top of the casing. The base is provided with a discharge 4 through which the material is taken from the casing. I may provide positive feeding and discharge means for the material, though such means are not shown as they do not relate to the invention. Posts 5 are arranged within the casing, the posts being connected together at their upper ends by the pieces 6 and a centrally arranged vertical shaft 7 is journaled in the base and part 6 and is rotated from a driven shaft 8 through means of the worm gear 9. A plurality of trays A are fastened to the shaft, one above the other, the first tray receiving the material dropping from the hopper. Each tray is formed of a plurality of sections 10, each section being of tapered shape with flanges 11 at its ends so that the sections form a ring-shaped tray with flanges at its inner and outer circumference. Each section is fastened to a rod or spoke 12 which has its inner end fastened to a cup-shaped hub member 13 which is fastened to the shaft and the outer end of each spoke is provided with an angle-shaped arm 14 which carries a roller 15 for engaging an annular track 16, fastened to the posts 5. Each track is interrupted and one end of the track is placed at an incline, as shown at 17, so that when the roller drops off the end 18 of the track and the tray section is tilted by means hereinafter to be described, the roller will strike the inclined part and ride up the same and thus the tray section will be tilted back to its normal and level position. In order to insure tilting of the tray sections I provide a pin 19 for engaging an upright 20 on each spoke 12 when the section reaches the end 18 of the track so that the spoke and tray section is given a partial rotary movement to dump the section, as shown in Figure 5. The pin 19 is carried by an upright 21 which is fastened to a strip 22 supported by the posts 5, it being understood that a strip 22 and an upright 21 and pin 19 are provided for each tray. As shown the spokes pass through holes in the hubs and are threaded to receive the nuts 21 so that the spokes are rotatably supported by the hubs.

Heat is supplied to the interior of the casing by means of steam or any other suitable heating medium being passed through the coils 23 which are arranged within the casing.

From the foregoing it will be seen that the material passing into the casing through the hopper 3 will fall upon the first tray at a point just in front of the inclined part 17 of the first track so that the sections receiving this material are in flat condition.

The material will be carried around with the sections until a section reaches the end 18 of the track when the pin 19 engaging the upright 21 and the roller dropping off the end of the track will cause the sections to tilt to a substantially vertical position and thus the material on this section will be dumped therefrom onto the next tray. As the roller strikes the inclined part 17 of the track it will ride up the same and thus the section will be returned to horizontal or flat condition so as to be ready to receive another supply of material passing from the hopper. The material dumped from the sections of the first tray will drop upon the sections of the second tray and will be carried around therewith until the sections of this tray are dumped and then the material will be deposited upon the third tray and from this tray it will be deposited upon the fourth tray and finally it will be dumped from this fourth tray into the outlet means. Thus the material is slowly passed through the casing so that it will be subjected to the heat therein for a long time and thus it will be thoroughly dried or sterilized. The action is entirely automatic and the apparatus will need practically no attention.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a casing, a vertically arranged shaft therein, a plurality of trays attached to the shaft, a track associated with each tray, each track being of annular construction with its ends spaced apart and with one end being arranged at an incline, each tray being composed of tiltable sections, a roller connected with each section and engaging the track and means for tilting each section as the roller leaves one end of the track and each section being returned to horizontal position by its roller running up the inclined portion of the track.

2. A device of the class described comprising a casing, a vertically arranged shaft therein, means for rotating the shaft, a plurality of trays having their hubs connected with the shaft, each tray consisting of a plurality of tiltable sections, a track associated with each tray, a roller connected with each tray section and engaging the track, each track having its ends spaced apart with one end arranged at an incline so that when a roller engages this inclined part the tray section will be returned to normal horizontal position, a stationary projection and a projection on each section for striking the same when the section reaches the end of the track for tilting the section to dumping position.

3. A device of the class described comprising a casing, a vertically arranged shaft therein having a plurality of trays carried by said shaft, means for rotating the shaft, a track associated with each tray, each track having its ends spaced apart with one end arranged at an incline, each tray consisting of a tiltable section and a hub section, a spoke connected with each section and rotatably connected with the hub section, an angle arm on the outer end of each spoke, a roller carried by the arm for engaging the track, a projection on each spoke and a stationary projection arranged at the end of each track for engaging the projection on the spoke for moving the tray section to dumping position after which the roller will engage the inclined part of the track so that the tray section is returned to normal horizontal position.

In testimony whereof I affix my signature.

EMIL WUNDERLICH.